UNITED STATES PATENT OFFICE.

GUSTAV JACOB LESSER, OF FRANKFORT-ON-THE-MAIN, GERMANY, ASSIGNOR TO ROBERT E. LESTER, OF NEW YORK, N. Y.

MANUFACTURE OF GLUE-SIZE.

SPECIFICATION forming part of Letters Patent No. 276,608, dated May 1, 1883.

Application filed March 29, 1883. (No specimens.)

*To all whom it may concern:*

Be it known that I, GUSTAV JACOB LESSER, of Frankfort-on-the-Main, Germany, have invented an Improvement in the Manufacture of Glue-Size, of which the following is a specification.

The glue used by manufacturers and in other various branches has the disadvantage that if diluted it will very soon become mildewed and rotten, will smell badly, and decompose, especially in warm climate.

My new process is, in general, to produce a size of very consistent form, and this strong consistency is effected by adding several chemicals at certain stages and temperature, which will prevent the bad smell, and always remain so free from smell, and will also preserve in any climate when stored away. The substances I use for this size are as follows: glue, (sometimes a clear white gelatine,) water, sulphate of alumina, alum, ammonia, (lump,) sulphate of magnesia, chloride of zinc, nitro-benzole, and carbolic acid. I take a quantity of glue, according to the strength required for the various branches, put it to soak in water, which I previously boil for two hours, in order to annihilate any animalculæ contained therein, and use it cold. After being soaked for about twenty-four hours I melt it in a copper boiler by a slow fire or steam, and add a solution of sulphate of alumina and alum. This solution consists of three parts of sulphate of alumina and one part of alum, which when very clear must be 3° Baumé. The latter must be thoroughly combined with the melted glue. I then add the nitro-benzole and carbolic acid, which are also previously combined together, (in equal parts,) and mix it in well. Then I add chloride of zinc, in which I pour the magnesia, and mix the whole. When thoroughly combined I immediately remove it into wooden vessels and let it cool off.

The water, used in the manner as above described, is a preservative by itself for the melted size. The sulphate of alumina, with the small proportion of alum, hardens the substance. The nitro-benzole and carbolic acid mixed together, and of which there is only a very small quantity used, do not allow any mildew. The chloride of zinc, together with the sulphate of magnesia, prevents the smell in one way. On the other hand, it does not allow the size to dry away, and keeps the same always fresh in any atmosphere.

The following formula, giving quantities of the materials to be used, I have found to give good results: thirty pounds of glue, eleven pounds of sulphate of alumina, three pounds of ammonia, (lump,) three pounds of chloride of zinc, two pounds of sulphate of magnesia, one-half ounce of nitro-benzole, one-half ounce of carbolic acid, and fifty-one pounds of water. This can be varied by using gelatine instead of glue, or by using equal proportions of glue and gelatine.

I do not limit myself to the exact proportions, nor to the different specified particular compounds, as a chemist may readily substitute equivalents.

What I claim is—

1. A glue-size composed of gelatine, an alkaline salt, one or more earth salts, and one or more metallic salts.

2. In glue-size, the combination of glue or gelatine, earth salts, metallic salts, and antiseptic substances, all substantially as set forth.

3. In glue-size, the combination of gelatine, sulphate of alumina, ammonia, chloride of zinc, sulphate of magnesia, nitro-benzole, and carbolic acid in the proportions substantially as set forth.

In witness whereof I have hereunto set my hand.

GUSTAV JACOB LESSER.

Witnesses:
 F. VOGELER,
 J. GRUND.